D. R. PRATT.
Carriage-Spring.
No. 6,215.  Patented Mar. 20, 1849.
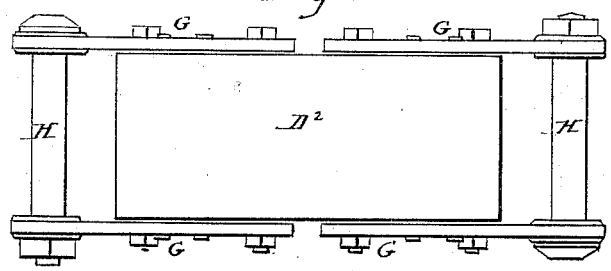
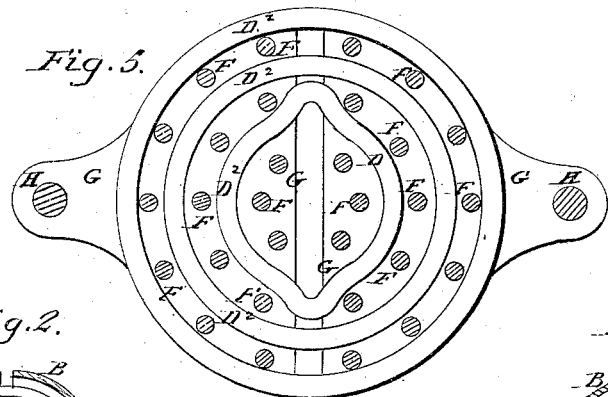
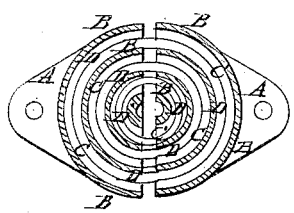
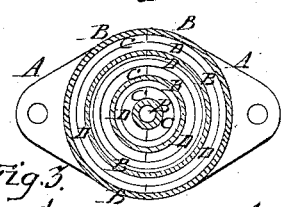
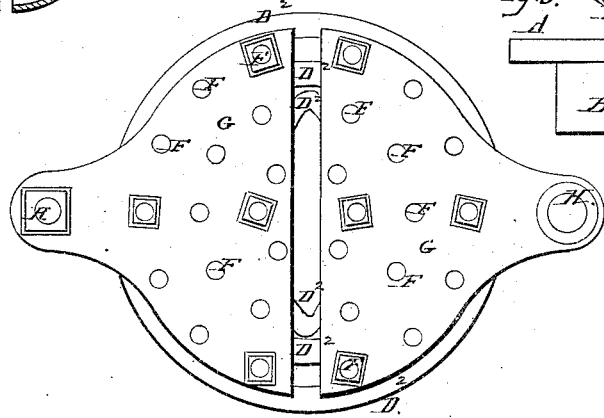

UNITED STATES PATENT OFFICE.

DANIEL R. PRATT, OF WORCESTER, MASSACHUSETTS.

SPRING FOR CARRIAGES, &c.

Specification of Letters Patent No. 6,215, dated March 20, 1849.

*To all whom it may concern:*

Be it known that I, DANIEL R. PRATT, of the town of Worcester, in the county of Worcester and State of Massachusetts, have invented a new and useful Mode of Constructing Carriage-Springs, which is described as follows, reference being had to the annexed drawings of the same, making part of this specification.

Figure 1, is an elevation showing two segment plates and semicircular rims and concentric endless elastic belts the ends of the segment plates being in contact and one belt only being in action as when a light load is in the body of the vehicle. Fig. 2 is also an elevation showing the segment plates separated and four of the segment rims in contact with two of the endless belts. Fig. 3 is an edge view of ditto. Fig. 4 is an elevation showing a modification of the plan in which pins are used instead of curved plates. Fig. 5 is a vertical section of ditto. Fig. 6 is an edge view of ditto.

Similar letters in the several figures refer to corresponding parts.

My invention and improvement consists in attaching to, or casting on, the face of plates A A a series of semi-circular or semi-oval rings B, B, B, which, when the plates A are brought together edgewise will form concentric circles, or ovals and chambers, or channels, C, C, C, of the same form as the rings in which are placed endless belts D D D of vulcanized india rubber of varying diameters so that when the edges of the plates are near together and but little weight is in the carriage the outer or larger belt will embrace the outer or larger rim and touch every portion of its surface and bear all the weight—one of said pair of plates being attached to the body of the carriage and the other to the running gear by goose necks, poppets, brackets, or any suitable and tasteful support, in any convenient and suitable position and manner—there being a pair of said plates and series of concentric belts of india rubber at each of the four corners of the body of the carriage substituted for the usual metallic or other springs.

When the edges of the plates touch, none of the belts touch the rings over which they are placed, except the largest, which is always in contact with the ring around which it is placed, as seen in Fig. 1. When more weight is placed in the carriage the plates will separate from each other causing the largest belt to extend itself until relieved by the next largest belt which will then be extended by the segmental rims around which it is conveyed, causing this and the first named belt to assume the form of ellipses as seen in Fig. 2. A still greater weight being added to the body of the carriage the next smaller belt will be made to act in supporting a portion of the weight and thereby relieving the strain on the larger belts before mentioned. And in this manner the smallest belt is also made to sustain its share of the load and to relieve the others of a portion of the strain when the load is increased to such degree as to cause the larger belts to extend or stretch to such extent as will cause the outer periphery of the smallest ring to touch the inner periphery of the smallest belt.

Concentric circles or ellipses of pins F inserted into the parallel plates G may be substituted for the rings as represented in Figs. 4 and 5—the endless belt $D^2$ of vulcanized india rubber being passed around these pins instead of the rings. In this arrangement two pairs of parallel plates into which the pins are inserted will be required instead of the single pair to which the rings are attached. These plates between which the belts and pins are arranged are attached to the body and running gear of the carriage by bolts H passed through the plates to which the connecting links are attached. They are connected to the carriage body in any convenient position or manner and by any suitable means.

The rings B may be let into corresponding grooves in the plates A or they may be attached to them in any convenient way; or they may be cast with the plates as above mentioned. The plates may be of a semi-elliptical or other form and of such form as to admit of openings for the connecting links.

From the foregoing description it will be seen that these springs or elastic rings or belts may be made to act in succession or simultaneously according to the weight of the body and load and when the elastic belts act separately and successively they form adjustive springs and when they act simultaneously they relieve each other.

What I claim as my invention and desire to secure by Letters Patent is—

The before described mode of making india rubber springs for carriages and other purposes by which the several endless elastic belts are successively brought into action as the load is increased, by means of the combination of the cencentric endless elastic belts and concentric rows of pins, or their equivalents, the concentric segment rings being connected to the plates attached to the body and running gear of carriages—the several parts being constructed and arranged substantially as above described.

In testimony whereof I have hereunto signed my name before two witnesses.

DANIEL R. PRATT.

Witnesses:
WM. P. ELLIOT,
LUND WASHINGTON, Sr.